United States Patent [19]

Saikaishi

[11] 3,881,155

[45] Apr. 29, 1975

[54] METHOD AND APPARATUS FOR DETECTING THE MULTI-PATH OF FM STEREO BROADCASTED WAVES

[75] Inventor: Noboru Saikaishi, Tokyo, Japan

[73] Assignee: Trio Electronics Incorporated, Tokyo, Japan

[22] Filed: July 5, 1973

[21] Appl. No.: 376,619

[30] Foreign Application Priority Data

July 8, 1972 Japan ................................ 47-68574

[52] U.S. Cl. ................. 325/344; 325/363; 325/398

[51] Int. Cl. ............................................ H04b 1/06

[58] Field of Search ............. 325/344, 36, 347, 349, 325/363, 67, 455, 398, 65; 329/131, 132, 134, 135; 179/15 BP, 15 BT

[56] References Cited

UNITED STATES PATENTS

| | | | |
|---|---|---|---|
| 3,128,345 | 4/1964 | Freedman et al. | 179/15 BT |
| 3,151,218 | 9/1964 | Dias et al. | 179/15 BT |
| 3,288,936 | 11/1966 | Jabbar | 179/15 BT |
| 3,346,699 | 10/1967 | Csicsatka | 179/15 BT |
| 3,525,045 | 8/1970 | Recklinghausen | 325/347 |
| 3,537,008 | 10/1970 | Lakatos | 325/65 |

*Primary Examiner*—Benedict V. Safourek
*Assistant Examiner*—Jin F. Ng
*Attorney, Agent, or Firm*—Dike, Bronstein, Roberts, Cushman and Pfund

[57] ABSTRACT

After receiving the FM stereo broadcasted wave the amplitude modulated component of the intermediate frequency component of the received wave caused by the multipath is detected, and an amplitude modulated component associated with the pilot signal is selectively amplified by means of a selective amplifier or an amplitude modulated component having a predetermined frequency is detected for use to operate display means or to adjust the position of the receiving antenna.

5 Claims, 2 Drawing Figures

METHOD AND APPARATUS FOR DETECTING THE MULTI-PATH OF FM STEREO BROADCASTED WAVES

BACKGROUND OF THE INVENTION

This invention relates to a method and apparatus for detecting the multi-path of a FM stereo broadcasted wave in which the multiple reflection of the FM stereo broadcasted wave propergated through the space, that is the so-called multi-path is detected for assuring satisfactory receiving conditions for broadcasted FM stereo waves.

In the reception of FM stereo broadcasted waves radiated from a broadcasting station, when waves which are reflected by nearby buildings or mountains are received by a receiver, such waves interfere with waves received by the receiver directly from the broadcasting station thereby subjecting the respective waves to both amplitude modulation and phase modulation. Although it is possible to eliminate the amplitude modulated component by the action of a limiter provided for the receiver it is impossible to effectively eliminate the phase modulated component, thereby degrading the distortion rate as well as the separation characteristic of the receiver. Such phenomenon does not cause any serious problem in the reception of monaural broadcasted waves but causes a serious problem in the reception of stereo broadcasted waves. However, since the multi-path simultaneously creates the amplitude modulated component and the phase modulated component of the mutually interferred waves, when the amplitude modulated component is detected it is possible to assume the amount of the phase modified component and hence the amount of the multi-path of the FM stereo broadcasted wave.

To assist better understanding of the invention, a prior art method and apparatus for detecting and displaying the multi-path of the FM stereo broadcasted wave will first be described with reference to FIG. 1 of the accompanying drawing. The apparatus shown in FIG. 1 comprises a receiving antenna 1, a high frequency stage 2, intermediate frequency stages 3 and 4, a detector 5, a low frequency stage 6, an amplitude modulated component detector 7 and an oscilloscope 8 having vertical and horizontal input terminals. When a FM stereo broadcasted wave containing modulated component caused by multi-path is received by antenna 1, the received wave is converted into an intermediate frequency signal by the operations of the high frequency stage 2 and the intermediate frequency stage 3, and the amplitude modulated component is detected by the operation of the amplitude modulated component detector 7 including a rectifier, a low pass filter, etc., and is then applied to the vertical input terminal V of the oscilloscope. On the other hand, a signal produced by the demodulation of the received wave by the detector 5 (or a low frequency signal passed through the low frequency stage 6) is impressed upon the horizontal input terminal H of the oscilloscope thus displaying a Lissajous pattern on the fluorescent screen of the oscilloscope by the coöperation of the vertical and horizontal signals. Accordingly, by observing the Lissajous pattern it is possible to detect the multi-path. However, this method and apparatus is expensive and complicated because use of an oscilloscope is essential.

It has also been proposed to indicate the amount of multi-path by applying the amplitude modulated component to such display apparatus as an indicating meter. While this method is inexpensive and handy, it is difficult to provide accurate detection because (a) the degree of modulation varies constantly, hence the amount of the multi-path also varies, (b) in addition to the multi-pass, frequency modulated wave also generates an amplitude modulated component due to the non-linear characteristic of the amplifier stages or the like of the receiver and (c) the degree of AM suppression differs depending upon the field intensity, especially AC suppression is not effective for large inputs.

SUMMARY OF THE INVENTION

It is an object of this invention to provide a novel method and apparatus for detecting the multi-path of a FM broadcasted wave capable of accurately detecting and or displaying the amount of the multi-path with simple and inexpensive display means such as an indicating meter.

According to one aspect of the invention, there is provided a method of detecting the multi-path of a FM stereo broadcasted wave wherein the wave received by a FM stereo receiver is converted into an intermediate frequency signal and the amplitude modulated component caused by the multi-path is detected from the intermediate frequency signal, characterized in that only the amplitude modulated component associated with the pilot signal in the amplitude modulated component is detected.

According to another aspect of this invention, there is provided apparatus for detecting the multi-path of a FM stereo broadcasted wave of the class comprising receiving means for receiving the FM stereo broadcasted wave, means responsive to the received wave for forming an intermediate frequency signal and means for deriving an amplitude modulated component out of the intermediate frequency signal, characterized by a selective amplifier responsive to the amplitude modulated component for selectively amplifying only an amplitude modulated component associated with the pilot signal.

In a modification, instead of using the selective amplifier for deriving out the amplitude modulated component associated with the pilot signal, a filter is used to select an amplitude modulated component having a predetermined frequency.

DESCRIPTION OF THE PREFERRED EMBODIMENT

Figures 1, 2:
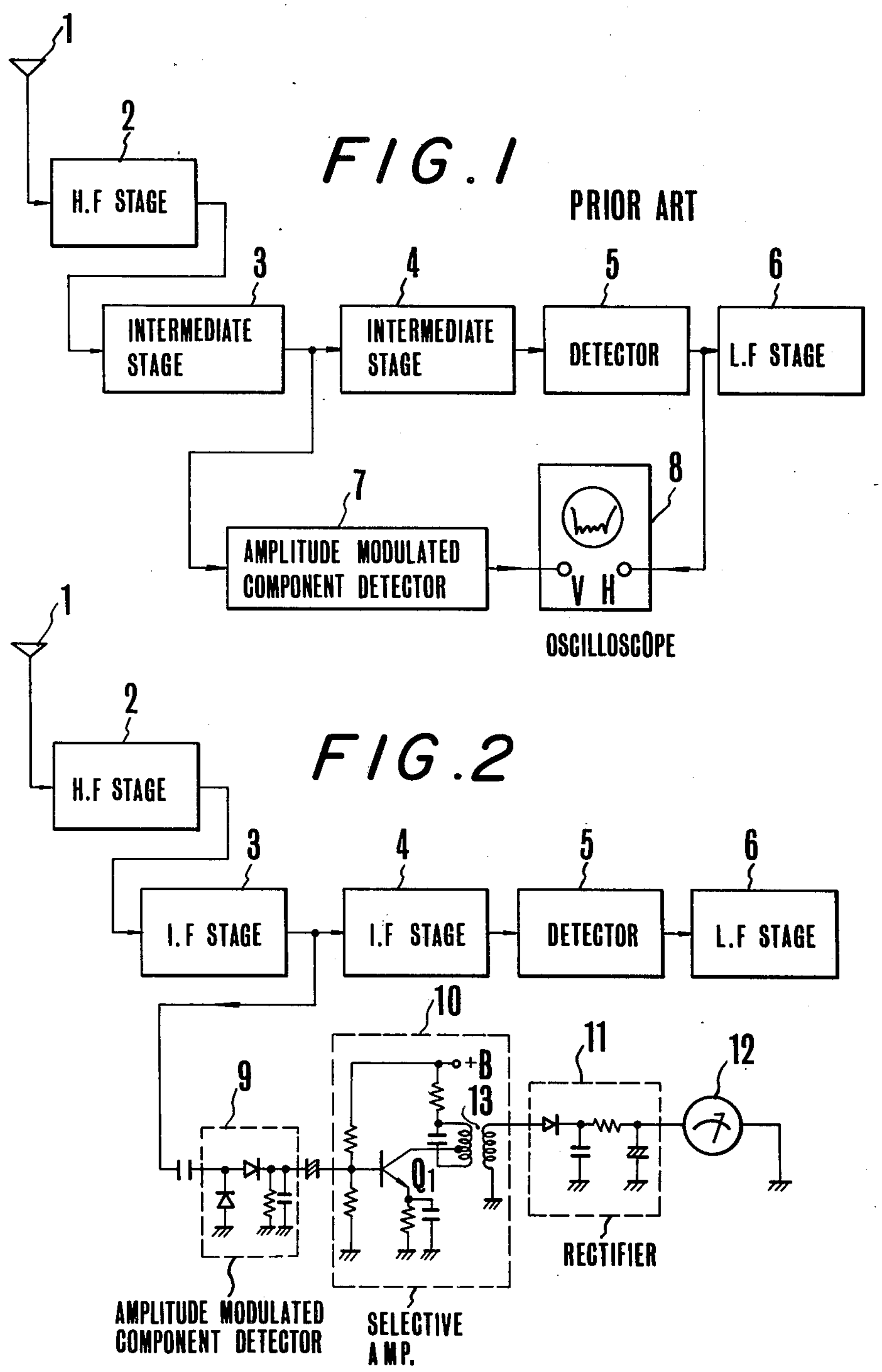
FIG. 1 is a block diagram showing one example of prior apparatus for displaying the multi-pass of a FM stereo broadcasted wave.
FIG. 2 is a block diagram showing one example of the novel apparatus for displaying the multi-path of a FM stereo broadcasted wave constructed according to the teaching of the invention.

In a preferred embodiment of the invention illustrated in FIG. 2, component elements corresponding to those shown in FIG. 1 are designated by the same reference numerals. The apparatus shown in FIG. 2 comprises an amplitude modulated wave detector 9 connected to the output of the first intermediate frequency stage 3, a selective amplifier 10 for the high frequency component (for example 38 KHz) of the pilot signal (for example 19 KHz), a rectifier circuit 11 and display means, for example an indicating meter 12, which are connected in cascade.

In operation, as has been described in connection with FIG. 1, when the FM stereo broadcasted wave containing an amplitude modulated component caused by the multi-path is received by the receiving antenna 1, the amplitude modulated component detector 9 functions to detect the amplitude modulated component of the intermediate frequency signal produced by the high frequency stage 2 and the intermediate frequency stage 3. Generally, the detected amplitude modulated component contains an amplitude modulated component due to the non-linear characteristic of the amplifier stages or the like element of the receiver, a multi-path component associated with the stereo composite signal and a multi-path component associated with the 19 KHz pilot signal.

Let us explain this with theoretical equations. Denoting the direct wave by a general equation:

$$i = A\ sin\ (2\ \pi ft + mf \sin 2\ \pi fst) \quad (1)$$

the reflected wave can then be expressed by $$ir = A \sin\ \{2\ \pi f\ (t+\Delta t) + mf \sin 2\pi fs\ (t+\Delta t)\} \quad (2)$$

where

A : amplitude of the wave $f$ : frequency of the carrier wave $fs$ : frequency of the modulation wave $mf$ : modulation index $\Delta t$ : time lag of the reflected wave with respect to the direct wave After compounding equations 1 and 2 the composite equation is developed with Bessel function to detect only the amplitude modulated component which is expressed as follows.

$$\begin{aligned} io &= i + ir \\ &= A\ \{Jo(mf) + 4J2(mf) \cos 4\pi fs(t+\Delta t/2) \\ &\quad x \cos 4\pi fs\Delta t/2 + 4J4(mf) \cos 8\pi fs(t+\Delta t/2) \\ &\quad x \cos 8\pi fs\Delta t/2\ \} \sin 2\pi f(t+\Delta t/2) \\ &\quad x \cos 2\pi f\Delta t/2 \end{aligned} \quad (3)$$

In equation 3, although the fifth and following terms are not shown, if we neglect the term cos $nfs\Delta t/2$ by the reason that it is approximately equal to unity, we obtain.

$$io = A\ \{\ Jo(mf) + 4J2(mf) \cos 4\pi fs(t+\Delta t/2) + 4J4(mf) \cos 8\pi fs(t+\Delta t/2)\ \}\ x \sin 2\pi f(t+\Delta t/2) \quad (4)$$

Although the amplitude modulated wave component expressed by equation 4 creates, as the modulated wave, the stereo composite signal and the pilot signal described above the degree of frequency modulation for the stereo composite signal has been varied so that the amplitude modulated component associated therewith has also been varied accordingly. For this reason, the amplitude modulated component expressed by the equation is not suitable for use as a detected signal for application to meter 12. However, because the degree of modulation for the 19 KHz pilot signal is constant, the magnitude of the amplitude modulated component associated with the 19 KHz pilot signal does not vary appreciably and hence can be considered substantially constant. For this reason, this component is suitable to use as a detected signal for application to meter 12.

As can be noted from equation 4, since the amplitude modulated component is expressed by a harmonic component having a large amplitude (for example, second harmonic) of the modulation wave the amplitude modulated component detector 9 is constructed such that the amplitude modulated component detected thereby is amplified by the selective amplifier 10 comprising a transistor $Q_1$ and that only the 38 KHz amplitude modulated component, or the second harmonic of the 19 KHz pilot signal is detected by a coil 13 connected to the collector electrode of the transistor $Q_1$ and tuned to 38 KHz, the magnitude of this component is substantially constant, whereas the other amplitude modulated components are eliminated by the selective amplifier 10. The 38 KHz amplitude modulated component thus detected is rectified by rectifier circuit 11 and the resulting direct current is applied to meter 12 for displaying its magnitude. Thus by observing the meter 12 it is possible to determine the amount of the multi-path received by the receiver.

Although in the foregoing description only the second harmonic, that is the 38 KHz modulated component was detected and displayed it will be clear that it is also possible to detect and display only the 19 KHz amplitude modulated component for the fundamental wave of the 19 KHz pilot signal or the amplitude modulated component of a higher harmonic. Further, instead of using a selective amplifier for detecting the amplitude modulated component it is also possible to use a filter to select an amplitude modulated component having a predetermining frequency for using the same directly or after amplification to provide a display. Alternatively, it is possible to apply the amplitude modulated component obtained by the method of this invention and associated with the pilot signal to the vertical terminal of an conventional oscilloscope to display the amount of multi-path.

As above described, the invention provides a novel method and apparatus for detecting the multi-path of stereo broadcasted wave which can accurately detect the multi-path with simple means and can display it on such simple display means as an indicating meter. With this invention the display means accurately displays the amount of multi-path without accompanying errors due to voice and the amplitude modulated component generated in the receiver. Accordingly, it is possible to orient the antenna in the direction in which the amount of the multi-path is a minimum while observing the display means thereby improving the separation or distortion rate in the receiver, and enabling to fully utilize the capability of the receiver. In addition, it is also possible to set the antenna at a position where the standing wave of the feeder is a minimum thereby completely eliminating the external effect upon the receiver.

What is claimed is:

1. In a method of detecting the effect of multi-path transmission of a FM stereo broadcasted wave transmitted with FM modulation components including a pilot signal of predetermined frequency with constant amplitude modulation wherein the wave received by a FM stereo receiver is converted into an intermediate frequency signal, and the amplitude modulated wave caused by said multi-path transmission is detected from said intermediate frequency signal, the improvement which comprises the steps of selecting only said pilot signal from said amplitude modulated wave, further detecting the selected said pilot signal to recover a detected value of said constant amplitude modulation and utilizing said detected value as a measure of said multi-path transmission.

2. The method according to claim 1 wherein said step of utilizing said detected value comprises the step of applying said detected value to display means.

3. The method according to claim 1 wherein said step of selecting comprises the step of frequency selective tuning of said pilot signal from said amplitude modulated wave.

4. In apparatus for detecting the effect of multi-path transmission of a FM stereo broadcasted wave transmitted with FM modulation components including a pilot signal with constant amplitude modulation comprising receiving means for receiving said FM stereo broadcasted wave, means responsive to said received wave for forming an intermediate frequency signal, detector means for deriving the amplitude modulated components out of said intermediate frequency signal, a selective amplifier coupled to receive said amplitude modulated components for selectively amplifying only an amplitude modulated component associated with the pilot signal, and means coupled to the output of said selective amplifier for utilizing said amplitude modulated component associated with said pilot signal.

5. The apparatus according to claim 4 in which said means for utilizing comprises a rectifier for rectifying the output from said selective amplifier and a DC indicating meter energized by the output of said rectifier.

* * * * *